Figure 1:
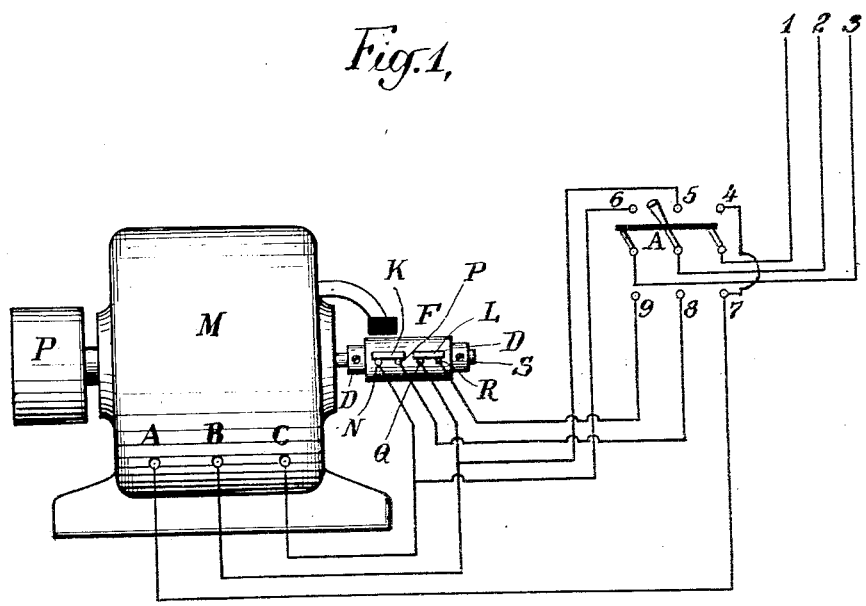

D. DU BOIS.
AUTOMATIC CONTROL OF MACHINERY.
APPLICATION FILED OCT. 10, 1912.

1,161,932.

Patented Nov. 30, 1915.
2 SHEETS—SHEET 1.

WITNESSES
Alfred E. Frost
Ira A. King

INVENTOR
Delafield Du Bois
BY
Francis B. Crocker
ATTORNEY

D. DU BOIS.
AUTOMATIC CONTROL OF MACHINERY.
APPLICATION FILED OCT. 10, 1912.
1,161,932.
Patented Nov. 30, 1915.
2 SHEETS—SHEET 2.
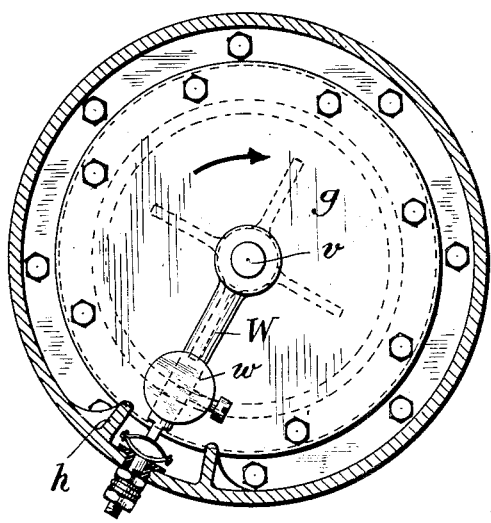
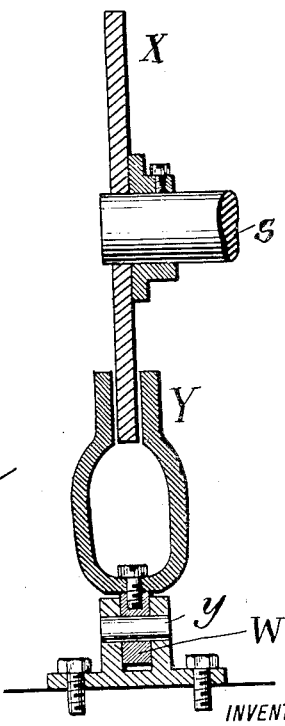
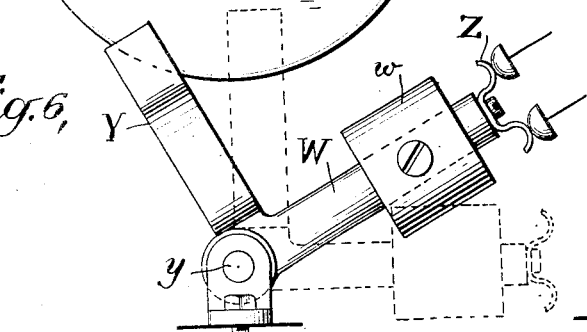
WITNESSES
Alfred E. Frost
Ira A. King
INVENTOR
Delafield Du Bois
BY Francis B. Crocker
ATTORNEY

UNITED STATES PATENT OFFICE.

DELAFIELD DU BOIS, OF NEW YORK, N. Y., ASSIGNOR TO CROCKER-WHEELER COMPANY, OF AMPERE, NEW JERSEY, A CORPORATION OF NEW JERSEY.

AUTOMATIC CONTROL OF MACHINERY.

1,161,932.      Specification of Letters Patent.      Patented Nov. 30, 1915.

Application filed October 10, 1912. Serial No. 724,921.

*To all whom it may concern:*

Be it known that I, DELAFIELD DU BOIS, a citizen of the United States, and resident of New York, in the county of New York and State of New York, have invented certain new and useful Improvements in the Automatic Control of Machinery, of which the following is a specification.

My invention relates to devices for use in connection with machinery which serve to limit or control the speed or direction of rotation of the latter. It relates particularly to switches applied to electric motors or other sources of power, and acting automatically above or below certain speeds or at any desired speeds, or when the machine stops or the direction of rotation changes, depending upon the conditions of service.

My invention is well adapted to be applied, for example, to electric motors which are stopped by dynamic braking. This well known method consists in reversing, or changing, the relations of the electric currents supplied to a motor while running in one direction, so that it tends to revolve in the opposite direction, and therefore its speed is reduced much more rapidly than if the supply circuit were simply opened. Difficulty is likely to arise, however, due to the fact that the motor may get running in the opposite direction unless the circuit is opened at the instant when the speed is zero. It is not easy to catch exactly the right moment, hence the motor may run first one way and then the other in a troublesome way when it is desired to stop it quickly. Furthermore, a reversed direction of rotation is objectionable for many kinds of machinery, such as printing presses, looms, hoisting apparatus, etc.

I overcome this difficulty by employing with such a motor a limit switch together with certain mechanical, as well as electrical, parts and connections which act automatically to control the main or auxiliary circuit at the proper instant so that the speed will be zero or practically zero, or will have reached any desired value in either direction of rotation.

In carrying out my invention the control may be effected by opening the supply circuit of an electric motor, for example, or by cutting off the driving power in the case of any machine. In some cases it is preferable merely to modify the conditions, as for example by varying the resistance in the main or field circuit or other auxiliary circuit of an electric motor.

There are various kinds of switches, auxiliary devices, and connections, by means of which my invention may be carried out in practice. In order that its nature and operation may be readily understood, I will first describe a simple arrangement of what I call the frictional type. I will also describe the hydraulic and magnetic types which are some of the modifications of my invention.

Figure 2:
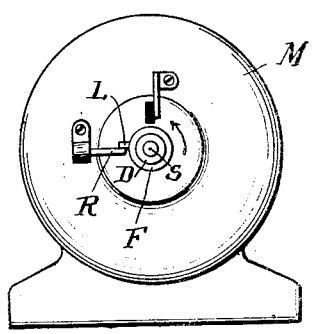
Figure 3:
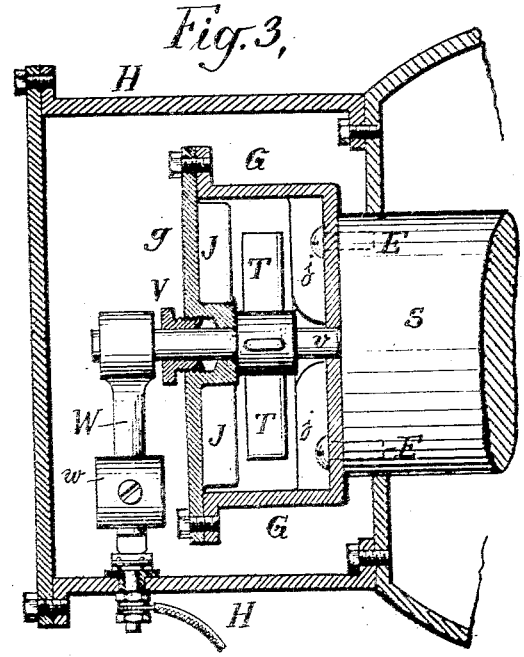

In the accompanying drawings, which illustrate these forms of my devices, Figure 1 is a diagram representing the general arrangement and connections of an electric motor adapted to be controlled in accordance with my invention; Fig. 2 is an end view of the same motor, showing the frictional element on the shaft and electrical contacts operated thereby; Fig. 3 is a sectional view in detail, illustrating a hydraulic form of device according to my invention; Fig. 4 is an end view of the same; Fig. 5 is a vertical section of a magnetic form of apparatus according to my invention, and Fig. 6 is an end view of the same.

In Figs. 1 and 2, M is a three-phase induction motor, adapted and used to run only in one direction while working. It is mechanically connected to the machine or apparatus which it drives by a belt on its pulley P, by gearing, or in any other suitable way. The motor is electrically connected to the three-phase supply circuit 1, 2, 3, through a double-throw switch, as clearly shown. When the arm A of this switch is in its upper position, these supply lines 1, 2, and 3, are connected to the three contact points, 4, 5, and 6 respectively, which in turn are connected directly to the motor terminals A, B and C respectively. This causes the motor to run with normal direction of rotation and perform its work. When it is desired to stop the motor, assuming that the conditions are such that it should come to rest quickly, the switch arm A is thrown to its lower position so that the supply lines 1, 2, and 3 are connected to the contact points, 7, 8 and 9 respectively. The effect of this change of connections is to reverse two of the three phases of the current supply with respect to the motor, and to cause their circuits to pass through the contact points N and P connected by the metallic strip K, also through the contact points Q and R connected by the metallic strip L. The contacts N, P, Q and R are stationary but the connecting strips K and L are carried on a drum F of insulating material that is mounted on the shaft S of the motor. This drum turns loosely on the shaft but is prevented from moving longitudinally by two collars D and D fixed to the shaft by set screws. While the motor is running with its normal direction of rotation, the friction between the drum F and shaft S give it a tendency to turn so as to press the strips K and L against the contact points N, P, Q and R, thus maintaining the connection between them, as stated and clearly shown. The effect, however, of reversing two of the phases of the current supplied to the motor is to apply dynamic braking, that is, its torque is opposed to the direction of rotation, which stops the motor quickly and would tend to make it turn in the opposite direction. This reversal of motion is often objectionable for the reasons already explained and is practically prevented or controlled by my device, because the slightest turning of the shaft in the wrong direction will carry the drum F with it by friction. The result is immediately to lift the strips K and L out of contact with the points N, P, Q and R, thus opening two of the three connections between the motor and the supply circuit, which completely and automatically cuts off the power just when the rotor is substantially at rest.

A hydraulic form of my apparatus is represented in detail in Figs. 3 and 4. Only the end of the motor shaft S is shown. Attached to it by screws EE and rotating with it is a cylindrical metallic box GG having a fluid tight cover $h$ bolted on as shown. Cast with the bottom and cover of this box, or attached thereto, are radial blades JJ and $jj$ which of course revolve with the box and shaft. A paddle wheel TT is mounted within the box GG between the two sets of blades JJ and $jj$, being carried by a little shaft U that turns freely in bearings formed in the box. This little shaft passes out through a stuffing box V to retain the water, oil or other liquid with which the box GG is filled. An arm W fixed to the outer end of the little shaft U is provided with electrical contacts at its lower end and a weight $w$ adjustable along the arm and held in place by a screw. When the main shaft S of the motor rotates, carrying in the box GG with its blades JJ and $jj$, the liquid contained in the box is whirled against the paddle TT and tends to cause it to revolve. This force is resisted by the arm W and weight $w$. By properly proportioning the blades, and other parts, and by adjusting the weight $w$, the arm W may be made to take and remain in the position shown, so long as the motor is running at any speed greater than a certain minimum. The electrical connections may be similar to those shown in Fig. 1. For running the motor, the switch arm is put in its upper position, the supply circuit being thus connected directly to the motor. In order to stop the motor, or to reduce its speed to a given value quickly, the switch arm A is thrown down which reverses the torque of the motor and produces dynamic braking effect. When the speed has decreased to a certain value, the force exerted by the revolving blades JJ and $jj$ on the paddle wheel TT becomes less than that required to hold the arm W and weight $w$ in the position indicated in Fig. 4, so that the arm falls toward the vertical and the electrical connections at its end are broken, which cuts off the current supply of the motor. By properly designing and adjusting the various parts, this cutting off of the current may be made to occur at any given fractional speed, or at a speed which is practically zero, depending upon the conditions of service in each case.

If desired, the stop $h$ that limits the movement of the arm W in Fig. 4 may be set farther to the right so that the motor, when running normally, causes the arm to rest against the stop $h$ at a certain angle to the right instead of to the left of a vertical line. With this arrangement, it would require a certain speed to be developed in a direction opposite to the normal before the force exerted by the revolving blades with respect to the paddle wheel TT would suffice to lift the arm W off of the stop and break the electrical connections so as to cut off the supply of current to the motor. In other words, the motor would reverse its direction of rotation and acquire a predetermined speed before the current would be cut off, which may be a desirable condition of operation in certain cases.

In Fig. 3 I have represented a casing H attached to the frame or bearing of the motor. This serves to protect the moving parts and electrical connections of my device from dirt and mechanical injuries, but is obviously not an essential element.

A magnetic form of my apparatus represented in Figs. 5 and 6 comprises a disk X of copper, or other conductive material, mounted on the shaft S of the motor. This disk is fixed to the shaft by a set screw and rotates with it, passing between the poles of a magnet Y. In this case I have represented a horse-shoe permanent magnet, but an electromagnet of either the direct or alternating current type, of any suitable form, could be used for the purpose. Rigidly attached to this magnet is an arm W, carrying at its end the electrical connecting pieces Z. The magnet, with its attached arm, is pivoted at y so as to be capable of swinging through a certain angle, as indicated by the solid and dotted lines in Fig. 6. The motor is caused to run in the normal direction, represented by an arrow in each case, by closing the switch, which may be similar to that shown in Fig. 1, in its upper position. The motion of the disk X between the poles of the magnet Y sets up Foucault currents in the former and their relation to the flux is such that they tend to drag the magnet to the left into the position indicated by solid lines. This force is sufficient to overcome the moment of the arm W and its weight $w$. In order to stop the motor, or to reduce its speed quickly, the switch arm is thrown to the downward position which reverses the effect of the supply currents, as already explained. When the speed of the motor falls to a certain value, depending upon the design of the device and adjustment of the weight $w$, the force exerted between the magnet and the Foucault disk will not be sufficient to counterbalance the effect of the weight, hence the magnet will swing on its pivot into the position shown by dotted lines in Fig. 6. At the same time the arm W is carried downward, breaking the electrical connections at Z, and cutting off the current that supplies the motor.

If desired, the magnet Y in Fig. 6 or the arm W in Fig. 4 may be provided with a spring stop to limit its motion to the left, or the weight $w$ may be proportioned and adjusted, so that the magnet Y or the arm W will swing still farther than represented to the left when the speed of the motor rises above its normal value, thus opening or controlling electrical connections in order to stop or otherwise affect the action of the motor. This arrangement would serve as a safety device to prevent excessive speed of the motor. At the same time, the device would act to stop or reduce the speed of a motor as described.

The form of my apparatus illustrated in Figs. 3 and 4 may be arranged very easily to act when the speed rises above a certain value. For example the quantity of liquid put into the box G is limited so that when it is thrown out by centrifugal force it occupies the peripheral space outside of the paddle T at a certain speed. Under these circumstances, there will be little or no liquid that flows or strikes against the blades of the paddle, and correspondingly little turning force exerted upon it. Hence the weight $w$ will cause the arm W to swing downward and break the electrical connections at a certain speed; for example, 10 per cent. above normal, for which the apparatus is designed and adjusted. When so arranged the same device will act not only at any desired low speed, but also at any desired high speed. Hence it is capable of performing both functions in a simple and convenient manner.

In either the hydraulic or magnetic forms of my apparatus, the force exerted upon the drag tends to increase as the speed of the moving element rises. In fact the force increases about as the square of the speed in these cases. Therefore the force may be undesirably great at higher speeds compared with that developed at low speeds. In order to correct this tendency, the quantity of liquid introduced into the box G in Fig. 3 may be limited so that, when it is thrown outward by centrifugal force as the speed rises, the paddle T will reach less and less deeply into the liquid, so that for that reason the force exerted may be made to rise less rapidly and thereby kept down to any desired values. Indeed, by properly proportioning the parts as well as the amount of liquid, the force may be made to decrease or even to cease at a high speed, as already explained.

In the case of the magnetic type of my device the force at high speeds may be relatively reduced or controlled by arranging the magnet Y with respect to the disk X in Fig. 6, so that the former acts upon a smaller area of the latter as the speed augments. In Fig. 6, for example, the dotted lines represent the magnet acting upon a considerable area of the disk at low speeds. When, however, the speed is high, the magnet covers a much smaller area of the disk, as represented by the solid lines, so that the tendency for the force to increase unduly is thereby counteracted and controlled at any desired values.

My devices may be utilized, if desired, to operate indicators, signals, or alarms to show the fact that the speed has any given high or low values, also that the machine has stopped. By having the electrical connections, shown in Figs. 1, 2, 3, 4, and 6 control the circuit of a bell, lamp or other indicator, the operation, or non-operation, of such indicator will show that the speed is high or low or has any particular value or direction.

It is evident that my invention is applicable to two-phase as well as to three-phase motors; it is also obvious that my invention may be readily applied to synchronous polyphase motors and to direct current motors; all that would be necessary is to provide another switch, or electrical connection, to control the excitation of the field magnet, for a motor of either of these types.

In order to set forth my invention as simply as possible, I have shown and described connections, contacts, and switches of elementary character. It is evident, however, that I may employ, in carrying out my invention, some of the more highly organized connecting and switching devices well known in the art. For example, I may use relays, or electro-magnetically operated switches to control the supply of current to the motor, in which case, the electrical connections on the drum F in Fig. 1 and on the arm W in Figs. 4 and 5 are required to carry only comparatively small currents.

I claim:

1. The combination of an electric motor with means for changing the relation of the currents supplied to it so as to reverse its electro-dynamic torque and means whereby the driving current is practically cut off when the direction of rotation reverses.

2. The combination with a machine of a drag that tends to be carried along by a moving part thereof and electrical connections that are operated at a certain high speed, also at a certain low speed.

3. The combination with a machine of a drag that is carried along by a moving part thereof and electrical connections controlled by said drag that shut off the driving power of said machine when the speed rises above a certain value, or falls below a certain value.

Signed at Ampere in the county of Essex and State of New Jersey this 8th day of October, A. D. 1912.

DELAFIELD DU BOIS.

Witnesses:
FRANCIS B. CROCKER,
HARVEY C. HARRISON.